(12) United States Patent
Kawakita et al.

(10) Patent No.: US 10,218,000 B2
(45) Date of Patent: Feb. 26, 2019

(54) POSITIVE ELECTRODE ACTIVE MATERIAL FOR NONAQUEOUS ELECTROLYTE SECONDARY BATTERY

(71) Applicant: Sanyo Electric Co., Ltd., Daito-shi, Osaka (JP)

(72) Inventors: Akihiro Kawakita, Hyogo (JP); Takeshi Ogasawara, Hyogo (JP); Daizo Jito, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/119,282

(22) PCT Filed: Feb. 13, 2015

(86) PCT No.: PCT/JP2015/000658
§ 371 (c)(1),
(2) Date: Aug. 16, 2016

(87) PCT Pub. No.: WO2015/125444
PCT Pub. Date: Aug. 27, 2015

(65) Prior Publication Data
US 2017/0012289 A1 Jan. 12, 2017

(30) Foreign Application Priority Data
Feb. 19, 2014 (JP) .................. 2014-029226

(51) Int. Cl.
*H01M 4/525* (2010.01)
*H01M 10/0525* (2010.01)
(Continued)

(52) U.S. Cl.
CPC ........... *H01M 4/525* (2013.01); *H01M 4/131* (2013.01); *H01M 4/36* (2013.01); *H01M 4/485* (2013.01);
(Continued)

(58) Field of Classification Search
CPC ........ H01M 4/525; H01M 4/131; H01M 4/36; H01M 4/485; H01M 4/523; H01M 4/624; H01M 10/0525; H01M 2004/028
(Continued)

(56) References Cited

U.S. PATENT DOCUMENTS 8,080,335 B2 * 12/2011 Kawakami ............. H01G 9/155
252/182.1
2002/0142224 A1 10/2002 Kweon et al.
(Continued)

FOREIGN PATENT DOCUMENTS

CN 102077396 A 5/2011
JP 2002-279991 A 9/2002
(Continued)

OTHER PUBLICATIONS

International Search Report dated May 19, 2015, issued in counterpart International Application No. PCT/JP2015/000658 (2 pages).
(Continued)

*Primary Examiner* — Harold Y Pyon
*Assistant Examiner* — Danny N Kang
(74) *Attorney, Agent, or Firm* — Westerman, Hattori, Daniels & Adrian, LLP

(57) ABSTRACT

A positive electrode active material for nonaqueous electrolyte secondary batteries is provided with which increased DCR after cycling can be controlled. A positive electrode active material according to an aspect of the present invention is secondary particles of a lithium transition metal oxide formed through the aggregation of primary particles of the oxide, the lithium transition metal oxide containing at least Ni. Secondary particles of a rare earth compound formed through the aggregation of particles of the rare earth compound are adhering to depressions each created between adjacent two of the primary particles on the surfaces of the
(Continued)

secondary particles. The secondary particles of the rare earth compound are adhering to both of the two adjacent primary particles at the depressions.

13 Claims, 4 Drawing Sheets

(51) Int. Cl.
- *H01M 4/131* (2010.01)
- *H01M 4/36* (2006.01)
- *H01M 4/62* (2006.01)
- *H01M 4/485* (2010.01)
- *H01M 4/52* (2010.01)
- *H01M 4/02* (2006.01)

(52) U.S. Cl.
CPC .......... *H01M 4/523* (2013.01); *H01M 4/624* (2013.01); *H01M 10/0525* (2013.01); *H01M 2004/028* (2013.01)

(58) Field of Classification Search
USPC ........................................................ 252/500
See application file for complete search history.

(56) References Cited

U.S. PATENT DOCUMENTS

| | | | |
|---|---|---|---|
| 2006/0177739 | A1 | 8/2006 | Endo et al. |
| 2008/0003503 | A1 | 1/2008 | Kawakami et al. |
| 2011/0117434 | A1* | 5/2011 | Ogasawara ........... H01M 4/131 429/223 |
| 2013/0183585 | A1* | 7/2013 | Sun ....................... H01M 4/505 429/223 |
| 2013/0236789 | A1 | 9/2013 | Matsumoto et al. |
| 2013/0309567 | A1 | 11/2013 | Ogata et al. |
| 2013/0330628 | A1 | 12/2013 | Hasegawa et al. |

FOREIGN PATENT DOCUMENTS

| | | |
|---|---|---|
| JP | 2005-196992 A | 7/2005 |
| JP | 2015-15088 A | 1/2015 |
| WO | 2005/008812 A1 | 1/2005 |
| WO | 2012/73874 A1 | 6/2012 |
| WO | 2012/99265 A1 | 7/2012 |
| WO | 2012/101948 A1 | 8/2012 |
| WO | 2014/049958 A1 | 4/2014 |
| WO | 2014/156054 A1 | 10/2014 |

OTHER PUBLICATIONS

English Translation of Chinese Search Report dated Feb. 27, 2018, issued in counterpart Chinese Patent Application No. 20180009653.9. (2 pages).

* cited by examiner

POSITIVE ELECTRODE ACTIVE MATERIAL FOR NONAQUEOUS ELECTROLYTE SECONDARY BATTERY

TECHNICAL FIELD

The present invention relates to a positive electrode active material for nonaqueous electrolyte secondary batteries.

BACKGROUND ART

The rapid development of mobile information terminals such as cellphones, laptops, and smartphones into smaller and lighter ones in recent years has led to a need for higher-capacity secondary batteries as power supplies for driving them. Nonaqueous electrolyte secondary batteries, which charge and discharge through the movement of lithium ions between positive and negative electrodes in association with charging and discharging, are widely used as power supplies to drive such mobile information terminals because of their high energy density and high capacity.

More recently, nonaqueous electrolyte secondary batteries have been focused on as power supplies for the operation of electric tools, electric vehicles (EVs), and hybrid electric vehicles (HEVs and PHEVs) and are expected to be used in a broader range of fields. Such a power supply for machine operation needs to have an increased capacity that allows for extended use and improved output characteristics for repeated high-rate charge and discharge in a relatively short period. In particular, in applications such as electric tools, EVs, HEVs, and PHEVs, it is essential to achieve a high capacity while maintaining output characteristics during high-rate charge and discharge.

Possible methods for increasing the capacity of a nonaqueous electrolyte secondary battery include the use of a material with a high Ni content of a positive electrode active material and increasing the charging voltage. However, positive electrode active materials the Ni content of which is high have the problem of increased resistance after cycling, although having high capacities.

For example, PTL 1 below suggests that allowing an element of Group 3 in the periodic table to be present on the surfaces of matrix particles as a positive electrode active material prevents the positive electrode active material from being reacting with the electrolytic solution and mitigates the associated degradation of charge and storage characteristics even at increased charging voltage.

Furthermore, PTL 2 below suggests that coating a core that contains a lithium compound with two or more surface treatment layers that contain compounds of coating elements provides a positive electrode active material for lithium secondary batteries that has superior capacity, electric energy, and cycle-life characteristics.

CITATION LIST

Patent Literature

PTL 1: International Publication No. 2005/008812
PTL 2: Japanese Published Unexamined Patent Application No. 2002-279991

SUMMARY OF INVENTION

Technical Problem

However, it was found that even the technologies disclosed in PTL 1 and 2 above fail to prevent increased DCR (direct current resistance; hereinafter also referred to as DCR), or degraded output characteristics, after cycling.

According to an aspect of the present invention, an object is to provide a positive electrode active material for nonaqueous electrolyte secondary batteries with which increased DCR after cycling is controlled.

Solution to Problem

According to an aspect of the present invention, a positive electrode active material for nonaqueous electrolyte secondary batteries is secondary particles of a lithium transition metal oxide formed through the aggregation of primary particles of the oxide, the lithium transition metal oxide containing at least Ni. Secondary particles of a rare earth compound formed through the aggregation of particles of the rare earth compound are adhering to depressions each created between adjacent two of the primary particles on the surfaces of the secondary particles. The secondary particles of the rare earth compound are adhering to both of the two adjacent primary particles at the depressions.

Advantageous Effects of Invention

According to the present invention, a positive electrode active material for nonaqueous electrolyte secondary batteries is provided with which increased DCR after cycling is controlled.

DESCRIPTION OF EMBODIMENTS

Figure 1:
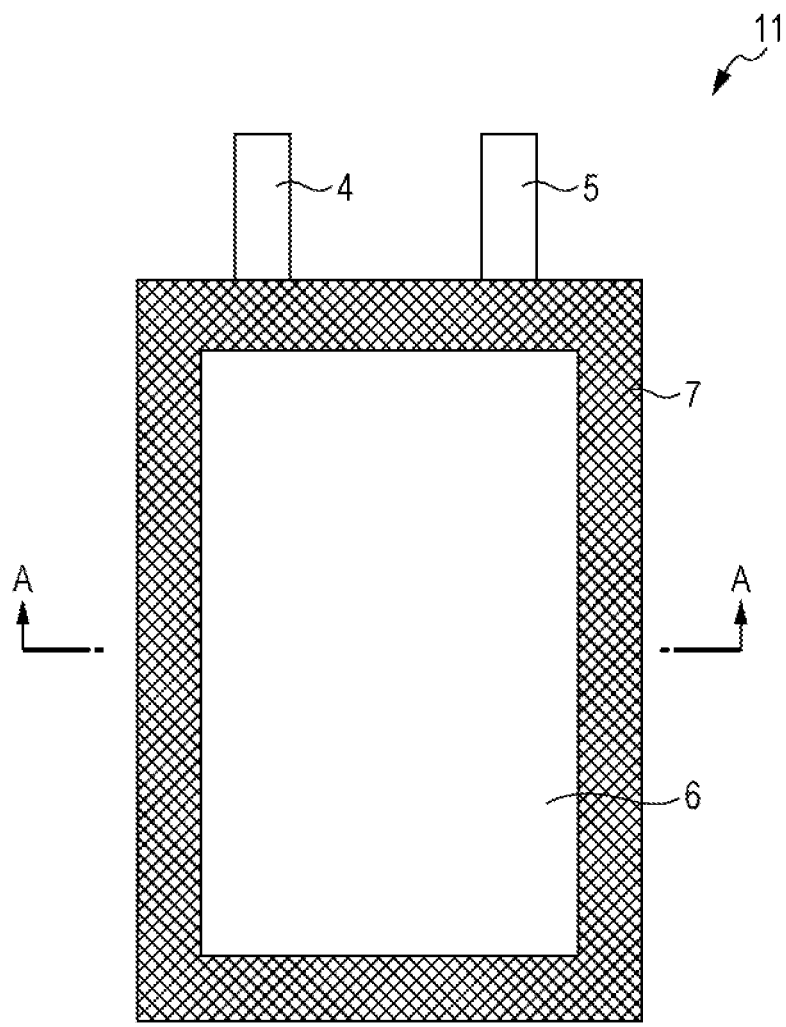
FIG. 1 is a schematic front view of a nonaqueous electrolyte secondary battery according to an aspect of the present invention.

The following describes an embodiment of the present invention. This embodiment is an example of implementing the present invention, and the present invention is not limited to this embodiment and can be implemented with any necessary change unless its gist is altered. The drawings referenced in describing the embodiment and Examples are schematics, and the dimensions, quantity, and other details of the structural elements illustrated in the drawings may be different from those in the actual things depicted.

[Positive Electrode]

A positive electrode active material for nonaqueous electrolyte secondary batteries as an example of an embodiment of the present invention is secondary particles of a lithium transition metal oxide that contains at least Ni formed through the aggregation of primary particles of the oxide. On the surfaces of the secondary particles, secondary particles of a rare earth compound formed through the aggregation of particles of the rare earth compound are adhering to depressions each created between adjacent two of the primary particles. The secondary particles of the rare earth compound are adhering to both of the two adjacent primary particles at the depressions.

Figure 3:
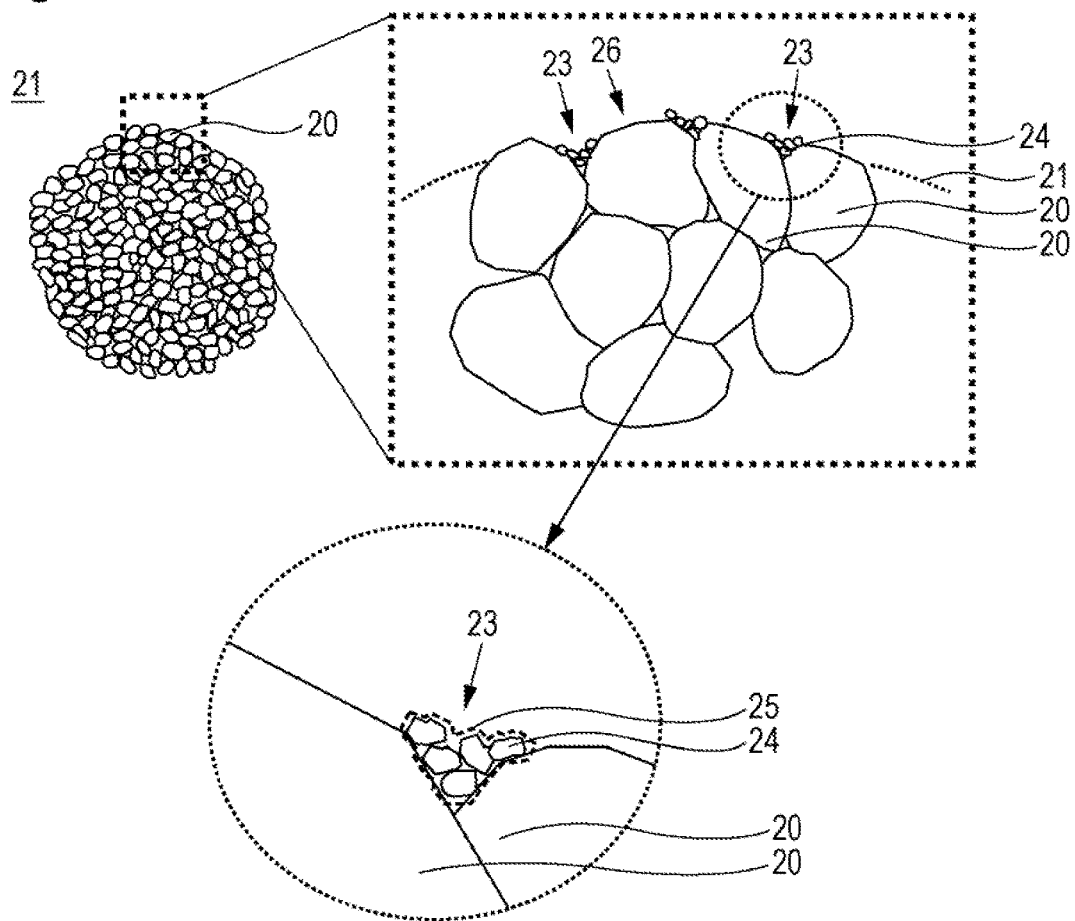
FIG. 3 illustrates a positive electrode active material according to Experimental Example 1 of the present invention and schematic enlarged cross-sections of part of this positive electrode active material.

The following describes the structure of this positive electrode active material for nonaqueous electrolyte secondary batteries in detail with reference to FIG. 3. As illustrated in FIG. 3, the positive electrode active material includes secondary particles 21 of a lithium transition metal oxide formed through the aggregation of primary particles 20 of the lithium transition metal oxide. On the surface of the secondary particles 21 of the lithium transition metal oxide, secondary particles 25 of a rare earth compound formed through the aggregation of primary particles 24 of the rare earth compound are adhering to depressions 23 each created between a primary particle 20 of the lithium transition metal oxide and a next primary particle 20. The secondary particles 25 of a rare earth compound are adhering to both of the primary particle 20 of the lithium transition metal oxide and the next primary particle 20 at the depressions 23.

This configuration, in which secondary particles of a rare earth compound formed through the aggregation of particles of the rare earth compound are adhering to depressions created between primary particles of a lithium transition metal oxide and adhering to both of two adjacent primary particles of the lithium transition metal oxide, prevents surface alteration of the surfaces of both of these adjacent primary particles and limits cracking that starts at the interface between the primary particles. The secondary particles of a rare earth compound also have the effect of fixing (bonding) adjacent two of the primary particles of a lithium transition metal oxide together, with which they prevent the active material from cracking at the interface between the primary particles after expanding and contracting during charge and discharge cycles. These prevent bad contacts between those primary particles of the lithium transition metal oxide that exist near the surfaces of the secondary particles of the lithium transition metal oxide. As a result, increased DCR after cycling is controlled, and the associated degradation of output characteristics is mitigated.

Secondary particles of a rare earth compound adhering to both of two adjacent primary particles of a lithium transition metal oxide at depressions herein represents a state where when a cross-section of a particle of the lithium transition metal oxide is observed, there are on the surface of a secondary particle of the lithium transition metal oxide depressions each created between two adjacent primary particles of the lithium transition metal oxide, and at these depressions the secondary particles of a rare earth compound are adhering to the surfaces of both of the two adjacent primary particles of the lithium transition metal oxide.

The positive electrode that contains this positive electrode active material is preferably composed of a positive electrode collector and a positive electrode mixture layer formed on the positive electrode collector. The positive electrode mixture layer preferably contains a binder and a conductive agent in addition to positive electrode active material particles. The positive electrode collector is, for example, a conductive thin-film body, in particular a foil of a metal or alloy that is stable in the range of positive electrode potentials, such as aluminum, or a film that has a surface layer of a metal such as aluminum.

It is preferred to use at least one rare earth compound selected from hydroxides, oxyhydroxides, oxides, carbonic acid compounds, phosphoric acid compounds, and fluorides of rare earth metals. It is particularly preferred to use at least one compound selected from hydroxides and oxyhydroxides of rare earth metals. The use of these rare earth compounds leads to more effective prevention of surface alteration occurring at interfaces between primary particles.

Examples of rare earth metals contained in the rare earth compound include scandium, yttrium, lanthanum, cerium, praseodymium, neodymium, samarium, europium, gadolinium, terbium, dysprosium, holmium, erbium, thulium, ytterbium, and lutetium. Particularly preferred are neodymium, samarium, and erbium. This is because neodymium, samarium, and erbium compounds are more effective in preventing surface alteration occurring at interfaces between primary particles than other rare earth compounds.

Besides hydroxides and oxyhydroxides such as neodymium hydroxide, neodymium oxyhydroxide, samarium hydroxide, samarium oxyhydroxide, erbium hydroxide, and erbium oxyhydroxide, specific examples of rare earth compounds include phosphoric acid compounds and carbonic acid compounds, such as neodymium phosphate, samarium phosphate, erbium phosphate, neodymium carbonate, samarium carbonate, and erbium carbonate, and oxides and fluorides, such as neodymium oxide, samarium oxide, erbium oxide, neodymium fluoride, samarium fluoride, and erbium fluoride.

The primary particles of the rare earth compound preferably have an average particle diameter of 5 nm or more and 100 nm or less, more preferably 5 nm or more and 80 nm or less.

The secondary particles of the rare earth compound preferably have an average particle diameter of 100 nm or more and 400 nm or less, more preferably 150 nm or more and 300 nm or less. When the average particle diameter is more than 400 nm, the particle diameters of the secondary particles of the rare earth compound are so large that the secondary particles of the rare earth compound adhere to only few depressions in the lithium transition metal oxide, and this may make the secondary particles of the rare earth compound less effective in limiting DCR increases because of many depressions in the lithium transition metal oxide not protected therewith. When the average particle diameter is less than 100 nm, the secondary particles of the rare earth compound are in contact between primary particles of the lithium transition metal oxide only in small areas, and the thus reduced effectiveness in fixing (joining) adjacent primary particles of the lithium transition metal together may make the secondary particles of the rare earth compound less effective in preventing cracking that starts at interfaces between the primary particles.

The secondary particles of the lithium transition metal oxide preferably have an average particle diameter of 2 μm or more and 40 μm or less, more preferably 4 μm or more and 20 μm or less. When the average particle diameter is less than 2 μm, the secondary particles are too small and the density of the positive electrode cannot be high, potentially making it difficult to achieve a high capacity. When the average particle diameter is more than 40 μm, the output may be insufficient particularly at low temperatures. The secondary particles of the lithium transition metal oxide are formed through the association (aggregation) of primary particles of the lithium transition metal oxide.

The primary particles of the lithium transition metal oxide preferably have an average particle diameter of 100 nm or more and 5 μm or less, more preferably 300 nm or more and 2 μm or less. When the average particle diameter is less than 100 nm, there are too many interfaces between the primary particles including those inside the secondary particles, and this may make the impact of cracking following expansion and contraction during cycling more significant. When the average particle diameter is more than 5 µm, the quantity of interfaces between the primary particles is so small including those inside the secondary particles that the output may be low particularly at low temperatures. Secondary particles are formed through the aggregation of primary particles; therefore, the primary particles of the lithium transition metal oxide cannot be larger than the secondary particles of the lithium transition metal oxide.

The proportion of the rare earth compound (the amount of adhering compound) is preferably 0.005% by mass or more and 0.5% by mass or less, more preferably 0.05% by mass or more and 0.3% by mass or less, on a rare earth metal basis with respect to the total mass of the lithium transition metal oxide. When this proportion is less than 0.005% by mass, little rare earth compound adheres to the depressions created between primary particles of the lithium transition metal oxide and the aforementioned effect of the rare earth compound may be insufficient for the control of increased DCR after cycling. When this proportion is more than 0.5% by mass, the rare earth compound covers the lithium transition metal oxide excessively, involving not only the spaces between primary particles but also the surfaces of secondary particles, and this may lead to low initial charge and discharge characteristics.

The lithium transition metal composite oxide is preferably one in which the proportion of Ni in the lithium transition metal oxide is 80% or more with respect to the total amount of metals excluding lithium not only because this can further increase the capacity of the positive electrode but also in order for the proton exchange described hereinafter at interfaces between the primary particles to be more likely to occur. In other words, it is preferred that the nickel content be 80% or more when the total amount by mole of non-Li metals in the lithium transition metal oxide is assumed to be 1. Specific examples of lithium transition metal composite oxides that can be used include lithium nickel cobalt manganese composite oxides, lithium nickel cobalt composite oxides, and lithium nickel cobalt aluminum composite oxides. Lithium-nickel-cobalt-aluminum composite oxides in particular can be ones in which the ratio by mole of nickel to cobalt to aluminum is such as 8:1:1, 82:15:3, or 94:3:3. These can be used alone or in mixture.

A lithium transition metal composite oxide in which the proportion of Ni (Ni content) is 80% or more is liable to undergo proton exchange between water and the lithium in the lithium transition metal oxide under aqueous conditions because of the high proportion of trivalent Ni. The LiOH resulting from the proton exchange emerges from inside interfaces between the primary particles of the lithium transition metal oxide and comes up to the surfaces of the secondary particles in large amounts. This leads to a higher concentration of alkali ($OH^-$) in the spaces between adjacent primary particles of the lithium transition metal oxide on the surfaces of the secondary particles of the lithium transition metal oxide than in the surroundings. At the depressions created between the primary particles, primary particles of the rare earth compound readily aggregate, in such a manner as to be attracted by the alkali, and separate out while forming secondary particles. With a lithium transition metal composite oxide in which the proportion of Ni is less than 80%, such proton exchange is rare because of the low proportion of Ni, and the alkali concentration in the spaces between the primary particles of the lithium transition metal oxide is little different from that in the surroundings. Primary particles of the rare earth compound that have separated out may associate into secondary particles, but when these secondary particles adhere to the surface of the lithium transition metal oxide, they are more likely to adhere to projections of primary particles of the lithium transition metal oxide because of higher likelihood of collision.

The lithium transition metal oxide may contain other elements added thereto. Examples of elements to be added include boron (B), magnesium (Mg), aluminum (Al), titanium (Ti), chromium (Cr), iron (Fe), copper (Cu), zinc (Zn), niobium (Nb), molybdenum (Mo), tantalum (Ta), zirconium (Zr), tin (Sn), tungsten (W), sodium (Na), potassium (K), barium (Ba), strontium (Sr), calcium (Ca), and bismuth (Bi).

To obtain a battery with superior high-temperature storage characteristics, it is preferred to stir the lithium transition metal oxide in some amount of water to remove alkali components adhering to the surface of the lithium transition metal oxide.

The production of a positive electrode active material for nonaqueous electrolyte secondary batteries as an example of this embodiment can be done through, for example, a method in which an aqueous solution that contains a rare earth metal is added to a suspension that contains a lithium transition metal oxide.

When this method is used, it is desirable to adjust the pH of the suspension to the range of 11.5 or more, preferably pH 12 or more, while adding the aqueous solution of a compound that contains a rare earth metal to the suspension. Treatment under these conditions helps particles of the rare earth compound adhere unevenly to the surfaces of secondary particles of the lithium transition metal oxide (i.e., the surface of a secondary particle of the lithium transition metal oxide has depressions and projections in its overall look, and the particles of the rare earth compound are not uniformly adhering to the projections or depressions (nonuniform adhesion)). Making the pH of the suspension 6 or more and 10 or less may cause the particles of the rare earth compound to adhere to the secondary particles of the lithium transition metal oxide to evenly cover their entire surface (i.e., the particles of the rare earth compound uniformly adhering to both the projections and depressions on the surfaces of the secondary particles of the lithium transition metal oxide), and this may lead to insufficient control of the aforementioned cracking of the active material due to surface alteration occurring at interfaces between its primary particles. When the pH is less than 6, the lithium transition metal oxide may be dissolved at least in part.

Furthermore, the pH of the suspension is desirably adjusted to the range of 14 or less, preferably pH 13 or less. This is because when the pH is more than 14, too large a size of the primary particles of the rare earth compound and an excess of alkali remaining inside the lithium transition metal oxide can cause problems such as quick gelation during the preparation of slurry and excessive generation of gas during the storage of the battery.

When adding the aqueous solution of a compound that contains a rare earth metal to the suspension that contains a lithium transition metal oxide, the manufacturer can make the product separate out as a rare earth hydroxide by simply doing this in water, and as a rare earth fluoride by adding a sufficient amount of a fluorine source to the suspension beforehand. Dissolving sufficient carbon dioxide gives a rare earth carbonic acid compound, adding sufficient phosphate ions to the suspension gives a rare earth phosphoric acid compound, and the rare earth compound can be separated out on the surfaces of the particles of the lithium transition metal oxide. Controlling the ions dissolved in the suspension gives, for example, a mixture of rare earth compounds including a hydroxide and a fluoride.

The particles of the lithium transition metal oxide with deposits of the rare earth compound on their surfaces can then be heated. The heating temperature is preferably 80° C. or more and 500° C. or less, more preferably 80° C. or more and 400° C. or less. At less than 80° C., heating may take an excessively long time to dry the obtained positive electrode active material sufficiently. At more than 500° C., diffusion of part of the surface-adhering rare earth compound into the particles of the lithium transition metal composite oxide may lead to less effective prevention of surface alteration occurring at interfaces between primary particles of the lithium transition metal oxide. When the heating temperature is 400° C. or less, the rare earth metal firmly adheres to the interfaces between primary particles of the lithium transition metal oxide with little of it diffusing into the particles, and thus is highly effective in preventing surface alteration occurring at the interfaces between primary particles of the lithium transition metal oxide and joining these primary particles together. When a rare earth hydroxide is attached to interfaces between the primary particles, most of the hydroxide changes into an oxyhydroxide at approximately 200° C. to approximately 300° C. and into an oxide at approximately 450° C. to approximately 500° C. Heating at 400° C. or less therefore ensures selective placement of a rare earth hydroxide or oxyhydroxide, a compound highly effective in preventing surface alteration, on interfaces between the primary particles of the lithium transition metal oxide, thereby providing superior control of DCR.

The heat treatment is preferably performed in a vacuum. Water in the suspension used to attach the rare earth compound penetrates to the inside of particles of the lithium transition metal oxide. Secondary particles of the rare earth compound adhering to the depressions created at interfaces between primary particles of the lithium transition metal oxide hinder the water inside from escaping during drying. If not in a vacuum, the heat treatment fails to remove the water effectively and an increased amount of water is brought into the battery from the positive electrode active material. The product of the reaction between the water and the electrolyte may alter the surface of the active material.

The aqueous solution that contains a rare earth metal can be a solution of the following rare earth compound (e.g., an acetate, a nitrate, an oxide, or a chloride) in water or organic solvent. For the sake of high solubility and other reasons, it is particularly preferred to use a solution in water. Note that when a rare earth oxide is used, the manufacturer can also use aqueous solutions of the sulfate, chloride, and nitrate of the rare earth metal obtained by dissolving the rare earth oxide in acids such as sulfuric acid, hydrochloric acid, nitric acid, and acetic acid because these are equivalent to the aforementioned solution of the compound in water.

The positive electrode active material is not limited to the use in which the particles of an above-described positive electrode active material, which is composed of a lithium transition metal oxide and secondary particles of a rare earth compound adhering to depressions in the oxide, are employed alone. A mixture of a positive electrode active material described above and another positive electrode active material may also be used. The additional positive electrode active material can be any compound to and from which lithium ions can be reversibly inserted and removed. For example, it is possible to use a compound with any structure to and from which lithium ions can be inserted and removed while maintaining a stable crystal structure such as one having a layered structure, e.g., lithium cobalt oxide or lithium nickel cobalt manganese oxide, one having a spinel structure, e.g., lithium manganese oxide or lithium nickel manganese oxide, or one having an olivine structure. When only a single positive electrode active material is used or different positive electrode active materials are used, the positive electrode active material or materials may have a constant particle diameter or different particle diameters.

The binder can be a material such as a fluorinated polymer or a rubber polymer. Examples of fluorinated polymers include polytetrafluoroethylene (PTFE), polyvinylidene fluoride (PVdF), and their modified forms, and examples of rubber polymers include ethylene-propylene-isoprene copolymers and ethylene-propylene-butadiene copolymers. These can be used alone, and it is also possible to use two or more of them in combination. The binder may be used in combination with a thickener such as carboxymethyl cellulose (CMC) or polyethylene oxide (PEO).

The conductive agent can be, for example, a carbon material, and examples include carbon materials such as carbon black, acetylene black, ketjen black, graphite, and vapor-grown carbon fiber (VGCF). These can be used alone, and it is also possible to use two or more of them in combination.

[Negative Electrode]

The negative electrode is obtained by, for example, mixing a negative electrode active material and a binder in water or any appropriate solvent, followed by application to a negative electrode collector, drying, and rolling. The negative electrode collector is preferably, for example, a conductive thin-film body, in particular a foil of a metal or alloy that is stable in the range of negative electrode potentials, such as copper, or a film that has a surface layer of a metal such as copper. The binder can be a material such as PTFE as in the positive electrode, but it is preferred to use a material such as a styrene-butadiene copolymer (SBR) or its modified form. The binder may be used in combination with a thickener such as CMC.

The negative electrode active material can be any material capable of reversibly storing and releasing lithium ions and can be, for example, a carbon material, a metal or alloy material that can be alloyed with lithium, such as Si or Sn, or a metal oxide. These can be used alone or as a mixture of two or more. Combinations of negative electrode active materials selected from carbon materials, metals or alloy materials that can be alloyed with lithium, and metal oxides can also be used.

[Nonaqueous Electrolyte]

The solvent for the nonaqueous electrolyte can be a cyclic carbonate such as ethylene carbonate, propylene carbonate, butylene carbonate, or vinylene carbonate or a linear carbonate such as dimethyl carbonate, methyl ethyl carbonate, or diethyl carbonate. It is particularly preferred to use a solvent mixture composed of cyclic and linear carbonates as a nonaqueous solvent highly conductive to lithium ions because of its high dielectric constant, low viscosity, and low melting point. The ratio by volume of the cyclic carbonate to the linear carbonate in this solvent mixture is preferably limited to the range of 0.5:9.5 to 3:7.

These solvents can be used in combination with, for example, ester-containing compounds such as methyl acetate, ethyl acetate, propyl acetate, methyl propionate, ethyl propionate, and γ-butyrolactone; compounds containing a sulfone group such as propanesultone; ether-containing compounds such as 1,2-dimethoxyethane, 1,2-diethoxyethane, tetrahydrofuran, 1,3-dioxane, 1,4-dioxane, and 2-methyltetrahydrofuran; nitrile-containing compounds such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and amide-containing compounds such as dimethylformamide. Solvents obtained through partial substitution of their hydrogen atoms H with fluorine atoms F can also be used.

The solute for the nonaqueous electrolyte can be a conventional solute, and examples include fluorine-containing lithium salts $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, and $LiAsF_6$. It is also possible to use a solute obtained by adding a lithium salt other than fluorine-containing lithium salts [a lithium salt that contains one or more of elements P, B, O, S, N, and Cl (e.g., $LiPO_2F_2$ or $LiClO_4$)] to a fluorine-containing lithium salt. It is particularly preferred that the solute include a fluorine-containing lithium salt and a lithium salt that contains an oxalato complex as anion because this ensures a stable coating is formed on the surface of the negative electrode even under high-temperature conditions.

Examples of such lithium salts that contain an oxalato complex as anion include LiBOB [lithium-bisoxalatoborate], $Li[B(C_2O_4)F_2]$, $Li[P(C_2O_4)F_4]$, and $Li[P(C_2O_4)F_2]$. Particularly preferred is LiBOB, which allows a stable coating to be formed on the negative electrode.

These solutes can be used alone, and it is also possible to use two or more of them in mixture.

[Separator]

The separator can be, for example, a polypropylene or polyethylene separator, a polypropylene-polyethylene multilayer separator, or a separator with its surface coated with resin such as an aramid resin.

There can be an inorganic filler layer at the interface between the positive electrode and the separator or between the negative electrode and the separator. The filler can also be an oxide or phosphoric acid compound that contains one or more of elements such as titanium, aluminum, silicon, and magnesium or such a compound with its surface treated with a hydroxide or similar. The filler layer can be formed by, for example, applying filler-containing slurry directly to the positive electrode, negative electrode, or separator to form the layer or by attaching a sheet of the filler to the positive electrode, negative electrode, or separator.

[Nonaqueous Electrolyte Secondary Battery]

A nonaqueous electrolyte secondary battery as an example of an embodiment of the present invention preferably has a positive electrode, a negative electrode, and a nonaqueous electrolyte. An example of a nonaqueous electrolyte secondary battery is, for example, a structure in which an electrode body, which is a roll or stack of positive and negative electrodes with a separator therebetween, and a nonaqueous liquid electrolyte, which is a nonaqueous electrolyte in the form of liquid, are contained in a battery sheathing can, but is not limited to this.

Figure 2:
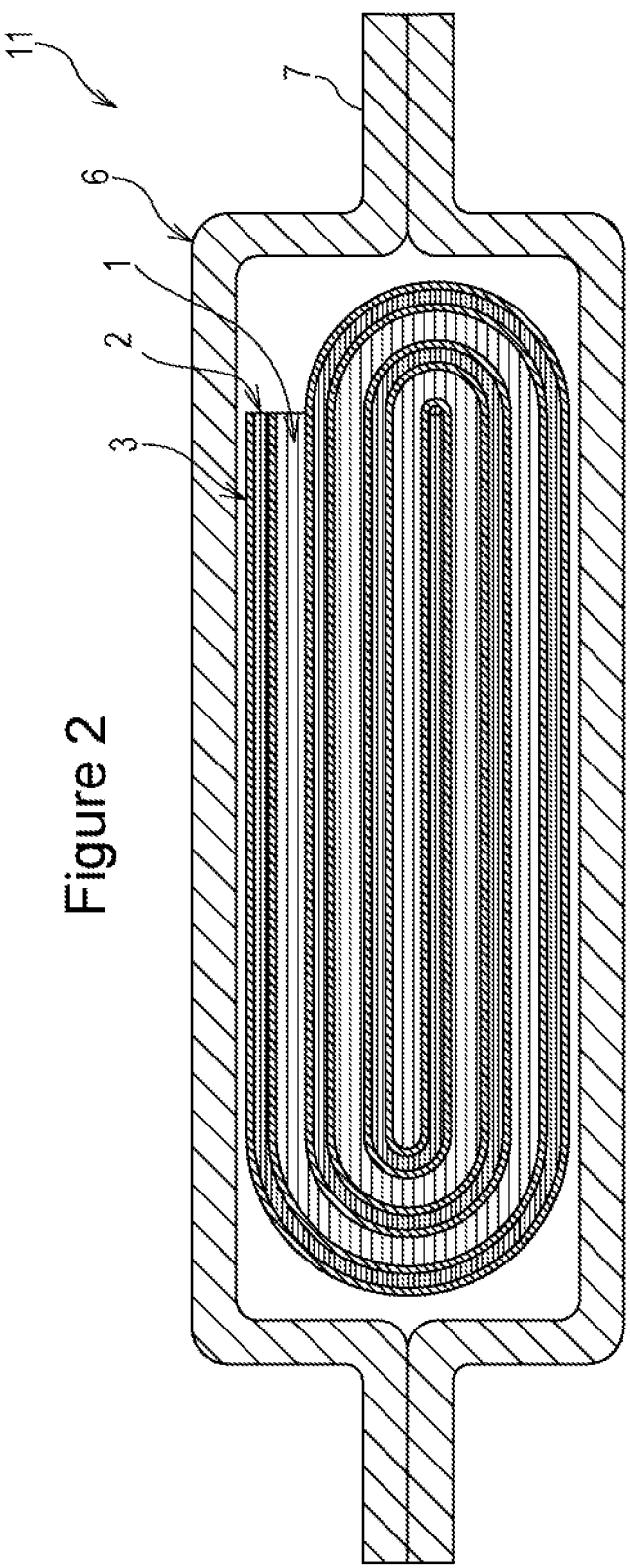
FIG. 2 is a schematic cross-section taken along line A-A in FIG. 1.

As illustrated in FIGS. 1 and 2, the detailed structure of this nonaqueous electrolyte secondary battery 11 includes a roll of a positive electrode 1 and a negative electrode 2 facing each other with a separator 3 therebetween, and the flat electrode body composed of these positive and negative electrodes 1, 2 and the separator 3 has been impregnated with a nonaqueous liquid electrolyte. The positive electrode 1 and the negative electrode 2 are connected to a positive electrode collector tab 4 and a negative electrode collector tab 5, respectively, and this structure allows the battery to charge and discharge as a secondary battery. The electrode body is located in a storage space in a laminated aluminum sheathing body 6 that has heat-seal sections 7 heat-sealed at their peripheries.

EXAMPLES

The following describes the present invention in more specific detail by providing some examples of experiments on an embodiment of the present invention. The present invention is in no way limited to these experimental examples and can be implemented with any necessary change unless its gist is altered.

First Experiment

Experimental Example 1

Preparation of Positive Electrode Active Material

A nickel-cobalt-aluminum composite hydroxide $Ni_{0.82}Co_{0.15}Al_{0.03}(OH)_2$ obtained by coprecipitation was transformed into oxide at 500° C., and LiOH was mixed with it in Ishikawa's grinding mortar to make the ratio by mole of Li to all transition metals 1.05:1. The mixture was heated at 800° C. for 20 hours in an oxygen atmosphere and milled to give a lithium-nickel-cobalt-aluminum composite oxide $Li_{1.05}Ni_{0.82}Co_{0.15}Al_{0.03}O_2$ with an average secondary particle diameter of approximately 15 μm.

The resulting lithium-nickel-cobalt-aluminum composite oxide particles as a lithium transition metal oxide were scaled to be 1000 g, and the scaled particles were added to 1.5 L of purified water and stirred. In this way, a suspension was prepared in which the lithium transition metal oxide was dispersed. Erbium oxide was dissolved in sulfuric acid to give an aqueous solution of erbium sulfate at a concentration of 0.1 mol/L, and this solution was added in portions to the suspension. The pH of the suspension was from 11.5 to 12.0 while the aqueous solution of erbium sulfate was being added to the suspension.

The suspension was then filtered, and the obtained powder was dried at 200° C. in a vacuum to give a powder of positive electrode active material particles composed of secondary particles of a lithium transition metal oxide and particles of an erbium compound adhering to the surfaces thereof. In this way, a positive electrode active material was prepared.

The surface of the resulting positive electrode active material was observed under a scanning electron microscope (SEM), revealing that secondary particles of erbium hydroxide with average particle diameters of 100 to 200 nm formed through the aggregation of primary particles of erbium hydroxide with average particle diameters of 20 to 30 nm were adhering to the surfaces of secondary particles of the lithium transition metal oxide. It was also found that most of the secondary particles of erbium hydroxide were adhering to depressions each created between two adjacent primary particles of the lithium transition metal oxide on the surfaces of secondary particles of the lithium transition metal oxide, adhering in such a manner as to be in contact with both of the two adjacent primary particles at the depressions. The amount of adhering erbium compound as measured by inductively coupled plasma ionization (ICP) atomic emission spectrometry was 0.15% by mass of the lithium-nickel-cobalt-aluminum composite oxide on an elemental erbium basis.

In Experimental Example 1, the high pH of the suspension of 11.5 to 12.0 seemed to be associated with the formation of secondary particles of erbium hydroxide through the association (aggregation) of primary particles that separated from the suspension. Furthermore, in Experimental Example 1, the high proportion of Ni of 82% leads to an accordingly high proportion of trivalent Ni, and this promotes proton exchange that occurs between $LiNiO_2$ and $H_2O$ at interfaces between primary particles of the lithium transition metal oxide. On the surfaces of the secondary particles of the lithium transition metal oxide there are interfaces each created between two adjacent primary particles, and a large amount of LiOH resulting from the proton exchange emerges from inside these interfaces. The resulting high concentration of alkali in the spaces between adjacent superficial primary particles of the lithium transition metal oxide presumably led to the erbium hydroxide particles that separated from the suspension separating out while forming secondary particles in such a manner as to be attracted by the alkali and to aggregate at depressions created at the interfaces between the primary particles. In this case, the secondary particles of erbium hydroxide adhere to both of the two adjacent primary particles of the lithium transition metal oxide at the depressions. The aforementioned proton exchange is less common when the proportion of Ni is less than 80%, and this makes it difficult to deposit secondary particles of the rare earth compound selectively at the depressions existing at interfaces between primary particles of the lithium transition metal oxide.

Preparation of Positive Electrode

The positive electrode active material particles, carbon black as a conductive agent, and a solution of polyvinylidene fluoride as a binder in N-methyl-2-pyrrolidone were weighed out to make the ratio by mass of the positive electrode active material particles to the conductive agent to the binder 100:1:1, and these were kneaded using T.K. HIVIS MIX (PRIMIX Corporation). Positive electrode mixture slurry was prepared in this way.

This positive electrode mixture slurry was then applied to both sides of an aluminum foil as a positive electrode collector, followed by drying of this, rolling with a roller, and attachment of an aluminum collector tab. In this way, a positive electrode plate was prepared as a positive electrode collector with a positive electrode mixture layer formed on each side thereof. The packing density of the positive electrode active material in this positive electrode was 3.60 g/cm$^3$.

Preparation of Negative Electrode

Negative electrode mixture slurry was prepared by mixing artificial graphite as a negative electrode active material, CMC (sodium carboxymethyl cellulose) as a dispersant, and SBR (styrene-butadiene rubber) as a binder in a ratio by mass of 100:1:1 in an aqueous solution. This negative electrode mixture slurry was uniformly applied to both sides of a copper foil as a negative electrode collector, followed by drying, rolling with a roller, and attachment of a nickel collector tab. In this way, a negative electrode plate was prepared as a negative electrode collector with a negative electrode mixture layer formed on each side thereof. The packing density of the negative electrode active material in this negative electrode was 1.75 g/cm$^3$.

Preparation of Nonaqueous Liquid Electrolyte

Ethylene carbonate (EC), methyl ethyl carbonate (MEC), and dimethyl carbonate (DMC) were mixed in a ratio by volume of 2:2:6, and in the resulting solvent mixture, lithium hexafluorophosphate (LiPF$_6$) was dissolved to a concentration of 1.3 mole/liter. Then a nonaqueous liquid electrolyte was prepared in which 2.0% by mass vinylene carbonate (VC) was dissolved in the solvent mixture.

[Assembly of Battery]

A spiral electrode body was fabricated by winging the thus obtained positive and negative electrodes into a spiral with a separator positioned between the two electrodes and removing the winding core. This spiral electrode body was then pressed to give a flat electrode body. This flat electrode body and the aforementioned nonaqueous liquid electrolyte were inserted into a laminated aluminum sheathing body. In this way, battery A1 was assembled. The size of the nonaqueous electrolyte secondary battery was 3.6 mm thick×35 mm wide×62 mm long. The discharge capacity of the nonaqueous electrolyte secondary battery when charged to 4.20 V and discharged to 3.0 V was 950 mAh.

Experimental Example 2

A positive electrode active material was prepared in the same way as in Experimental Example 1 above except that in the preparation of the positive electrode active material in Experimental Example 1, the pH of the suspension was held constant at 9 while the aqueous solution of erbium sulfate was being added to the suspension. This gave a positive electrode active material composed of secondary particles of a lithium transition metal oxide and particles of an erbium compound adhering to the surfaces thereof. The adjustment of the pH of the suspension to 9 was done through the addition of a 10% by mass aqueous solution of sodium hydroxide as needed.

The surface of the resulting positive electrode active material was observed under an SEM, revealing that primary particles of erbium hydroxide with average particle diameters of 10 nm to 50 nm were adhering to but in uniform distribution throughout the surfaces (involving both projections and depressions) of secondary particles of the lithium transition metal oxide without forming secondary particles. The amount of adhering erbium compound as measured by inductively coupled plasma ionization (ICP) atomic emission spectrometry was 0.15% by mass of the lithium-nickel-cobalt-aluminum composite oxide on an elemental erbium basis.

In Experimental Example 2, the rate of separation of erbium hydroxide particles from the suspension was slow because the pH of the suspension was 9, and this seemingly caused the particles of erbium hydroxide to be uniformly deposited throughout the surfaces of secondary particles of the lithium transition metal oxide without forming secondary particles.

The thus obtained positive electrode active material was used. Except for this, the same procedure was followed as in Experimental Example 1 above to produce battery A2.

Experimental Example 3

Nonaqueous electrolyte secondary battery A3 was produced in the same way as in Experimental Example 1 above except that in the preparation of the positive electrode active material in Experimental Example 1 above, no aqueous solution of erbium sulfate was added to the suspension in which the lithium transition metal oxide was dispersed and therefore no erbium hydroxide was attached to the surfaces of secondary particles of the lithium transition metal oxide.

Experimental Example 4

Battery A4 was produced in the same way as in Experimental Example 1 above except that in the preparation of the positive electrode active material in Experimental Example 1 above, an aqueous solution of samarium sulfate at a concentration of 0.1 mol/L was used in the suspension in which the lithium transition metal oxide was dispersed instead of the aqueous solution of erbium sulfate.

The surface of the positive electrode active material was observed under a scanning electron microscope (SEM), revealing that secondary particles of samarium hydroxide with average particle diameters of 100 to 200 nm formed through the aggregation of primary particles of samarium hydroxide with average particle diameters of 20 to 30 nm were adhering to the surfaces of secondary particles of the lithium transition metal oxide. It was also found that most of the secondary particles of samarium hydroxide were adhering to depressions each created between two adjacent primary particles of the lithium transition metal oxide on the surfaces of secondary particles of the lithium transition metal oxide, adhering in such a manner as to be in contact with both of the two adjacent primary particles at the depressions. The amount of adhering samarium compound as measured by inductively coupled plasma ionization (ICP) atomic emission spectrometry was 0.13% by mass of the lithium-nickel-cobalt-aluminum composite oxide on an elemental samarium basis.

Experimental Example 5

Battery A5 was produced in the same way as in Experimental Example 1 above except that in the preparation of the positive electrode active material in Experimental Example 1 above, an aqueous solution of neodymium sulfate at a concentration of 0.1 mol/L was used in the suspension in which the lithium transition metal oxide was dispersed instead of the aqueous solution of erbium sulfate.

The surface of the positive electrode active material was observed under a scanning electron microscope (SEM), revealing that secondary particles of neodymium hydroxide with average particle diameters of 100 to 200 nm formed through the aggregation of primary particles of neodymium hydroxide with average particle diameters of 20 to 30 nm were adhering to the surfaces of secondary particles of the lithium transition metal oxide. It was also found that most of the secondary particles of neodymium hydroxide were adhering to depressions each created between two adjacent primary particles of the lithium transition metal oxide on the surfaces of secondary particles of the lithium transition metal oxide, adhering in such a manner as to be in contact with both of the two adjacent primary particles at the depressions. The amount of adhering neodymium compound as measured by inductively coupled plasma ionization (ICP) atomic emission spectrometry was 0.13% by mass of the lithium-nickel-cobalt-aluminum composite oxide on an elemental neodymium basis.

Experimental Example 6

Battery A6 was produced in the same way as in Experimental Example 1 above except that in the preparation of the positive electrode active material in Experimental Example 1 above, an aqueous solution of ammonium zirconium carbonate at a concentration of 0.1 mol/L was used in the suspension in which the lithium transition metal oxide was dispersed instead of the aqueous solution of erbium sulfate.

The surface of the positive electrode active material was observed under a scanning electron microscope (SEM), revealing that secondary particles of zirconium hydroxide with average particle diameters of 100 to 200 nm formed through the aggregation of primary particles of zirconium hydroxide with average particle diameters of 20 to 30 nm were adhering to the surfaces of secondary particles of the lithium transition metal oxide. It was also found that most of the secondary particles of zirconium hydroxide were adhering to depressions each created between two adjacent primary particles of the lithium transition metal oxide on the surfaces of secondary particles of the lithium transition metal oxide, adhering in such a manner as to be in contact with both of the two adjacent primary particles at the depressions. The amount of adhering zirconium compound as measured by inductively coupled plasma ionization (ICP) atomic emission spectrometry was 0.07% by mass of the lithium-nickel-cobalt-aluminum composite oxide on an elemental zirconium basis.

Reference Example 1

A nickel-cobalt-manganese composite hydroxide $Ni_{0.35}Co_{0.35}Mn_{0.30}(OH)_2$ obtained by coprecipitation was transformed into oxide at 500° C., and LiOH was mixed with it in Ishikawa's grinding mortar to make the ratio by mole of Li to all transition metals 1.05:1. The mixture was heated at 1000° C. for 20 hours in an oxygen atmosphere and milled to give a lithium-nickel-cobalt-manganese composite oxide $Li_{1.05}Ni_{0.35}Co_{0.35}Mn_{0.30}O_2$ with an average secondary particle diameter of approximately 15 μm.

In the preparation of the positive electrode active material, the positive electrode active material was prepared in the same way as in Experimental Example 1 above except that the lithium-nickel-cobalt-manganese composite oxide $Li_{1.05}Ni_{0.35}Co_{0.35}Mn_{0.30}O_2$ prepared in the step above was used instead of the lithium-nickel-cobalt-aluminum composite oxide $Li_{1.05}Ni_{0.82}Co_{0.15}Al_{0.03}O_2$ in Experimental Example 1. This gave a positive electrode active material composed of secondary particles of a lithium transition metal oxide and particles of an erbium compound adhering to the surfaces thereof.

The surface of the resulting positive electrode active material was observed under an SEM, revealing that secondary particles of erbium hydroxide with average particle diameters of 100 to 200 nm formed through the aggregation of primary particles of erbium hydroxide with average particle diameters of 20 nm to 30 nm were adhering to the surfaces of secondary particles of the lithium transition metal oxide. It was also found that the secondary particles of erbium hydroxide were adhering to projections on the surfaces of secondary particles of the lithium transition metal oxide or, even at depressions created between primary particles of the lithium transition metal oxide, to only one of two adjacent primary particles of the lithium transition metal oxide. The amount of adhering erbium compound as measured by inductively coupled plasma ionization (ICP) atomic emission spectrometry was 0.15% by mass of the lithium-nickel-cobalt-aluminum composite oxide on an elemental erbium basis.

In Reference Example 1, the low proportion of Ni of 35% led to an accordingly low proportion of trivalent Ni, and this presumably caused almost complete inhibition of the aforementioned reaction in which LiOH resulting from proton exchange comes up to the surfaces of secondary particles of the lithium transition metal oxide through the interfaces between primary particles of the lithium transition metal oxide. As a result, in Reference Example 1, primary particles of erbium hydroxide that separated from the suspension may have associated (aggregated) into secondary particles because of the high pH of the suspension of 11.5 to 12.0, but most of the secondary particles of erbium hydroxide adhering to the surface of the lithium transition metal oxide, unlike those in Experimental Example 1, probably adhered to projections on the surfaces of secondary particles of the lithium transition metal oxide because of higher likelihood of collision. There may be some secondary particles of erbium hydroxide that adhere to depressions, but in such a case, the secondary particles of erbium hydroxide adhere to only one of two adjacent primary particles of the lithium transition metal oxide at the depressions.

The thus obtained positive electrode active material was used. Except for this, the same procedure was followed as in Experimental Example 1 above to produce battery B1.

Reference Example 2

In the preparation of the positive electrode active material, the positive electrode active material was prepared in the same way as in Experimental Example 2 above except that the lithium-nickel-cobalt-manganese composite oxide $Li_{1.05}Ni_{0.35}Co_{0.35}Mn_{0.30}O_2$ obtained in Reference Example 1 above was used instead of the lithium-nickel-cobalt-aluminum composite oxide $Li_{1.05}Ni_{0.82}Co_{0.15}Al_{0.03}O_2$ in Experimental Example 2. This gave a positive electrode active material composed of secondary particles of a lithium transition metal oxide and particles of an erbium compound adhering to the surfaces thereof.

The surface of the resulting positive electrode active material was observed under an SEM, revealing that primary particles of erbium hydroxide with average particle diameters of 10 nm to 50 nm were adhering to but in uniform distribution throughout the surfaces (involving both projections and depressions) of secondary particles of the lithium transition metal oxide without forming secondary particles. The amount of adhering erbium compound as measured by inductively coupled plasma ionization (ICP) atomic emission spectrometry was 0.15% by mass of the lithium-nickel-cobalt-aluminum composite oxide on an elemental erbium basis.

In Reference Example 2, similar to Experimental Example 2, the rate of separation of erbium hydroxide particles from the suspension was slow because the pH of the suspension was 9, and this seemingly caused the particles of erbium hydroxide to be uniformly deposited throughout the surfaces of secondary particles of the lithium transition metal oxide without forming secondary particles.

The thus obtained positive electrode active material was used. Except for this, the same procedure was followed as in Experimental Example 1 above to produce battery B2.

Reference Example 3

In the preparation of the positive electrode active material, the positive electrode active material was prepared in the same way as in Experimental Example 3 above except that the lithium-nickel-cobalt-manganese composite oxide $Li_{1.05}Ni_{0.35}Co_{0.35}Mn_{0.30}O_2$ obtained in Reference Example 1 above was used instead of the lithium-nickel-cobalt-aluminum composite oxide $Li_{1.05}Ni_{0.82}Co_{0.15}Al_{0.03}O_2$ in Experimental Example 3. This gave a positive electrode active material as secondary particles of a lithium transition metal oxide with no erbium compound adhering to the surfaces thereof.

The thus obtained positive electrode active material was used. Except for this, the same procedure was followed as in Experimental Example 1 above to produce battery B3.

(Testing)
[Measurement of DCR]

Batteries A1 to A6 and batteries B1 to B3 produced as above were each subjected to 100 charge and discharge cycles, with charging and discharge under the following conditions constituting one cycle. The DCR after 100 cycles was measured in accordance with formula (1) below.

<Charge and Discharge Conditions>

Charging Conditions

Constant-current charging was performed at a current of 475 mA until the battery voltage reached 4.2 V (a positive electrode potential of 4.3 V with lithium as the reference), and after the battery voltage reached 4.2 V, constant-voltage charging was performed at a constant voltage of 4.2 V until the current reading reached 30 mA.

Discharging Conditions

Constant-current discharge was performed at a constant current of 950 mA until the battery voltage reached 3.0 V.

Halt

The duration of the halt between the above charging and discharge was 10 minutes (1 to 99 cycles) except for cycle 100, where the halt was 120 minutes.

DCR (Ω)=(OCV (V)−Voltage at 10 seconds of discharge (V))/(Current reading (A))     (1)

[Calculation of DCR Index]

Then, for each of batteries A1 to A6 and batteries B1 to B3 that completed 100 cycles of charge and discharge, the DCR index after 100 cycles was calculated in accordance with formula (2) below. These calculations assumed that for each of the lithium-nickel-cobalt-manganese composite oxides with different compositions, the battery with no rare earth compound adhering to the surface of the oxide had a 100-cycle DCR of 100 (reference). More specifically, for batteries A1 to A6, in which $Li_{1.05}Ni_{0.82}Co_{0.15}Al_{0.03}O_2$ was used, the 100-cycle DCR of battery A3 was assumed to be 100 (reference). For batteries B1 to B3, in which $Li_{1.05}Ni_{0.35}Co_{0.35}Mn_{0.30}O_2$ was used, the 100-cycle DCR of battery B3 was assumed to be 100 (reference). The results are summarized in Table 1.

DCR index (SOC50%)=(100-cycle DCR of the battery (SOC50%)/(100-cycle DCR of the battery with no surface-adhering rare earth compound (SOC50%))×100     (2)

TABLE 1

| Battery | Lithium transition metal oxide | Adhering compound | State of adhesion | DCR index after 100 cycles |
|---|---|---|---|---|
| A1 | $Li_{1.05}Ni_{0.82}Co_{0.15}Al_{0.03}O_2$ | Rare earth compound (Er) | Adhering to depressions at interfaces between primary particles (both of two adjacent primary particles at the depressions) | 78 |
| A2 | $Li_{1.05}Ni_{0.82}Co_{0.15}Al_{0.03}O_2$ | Rare earth compound (Er) | Adhering to but in uniform distribution throughout the surfaces of secondary particles | 101 |
| A3 | $Li_{1.05}Ni_{0.82}Co_{0.15}Al_{0.03}O_2$ | None | — | 100 |

TABLE 1-continued

| Battery | Lithium transition metal oxide | Adhering compound | State of adhesion | DCR index after 100 cycles |
|---|---|---|---|---|
| A4 | $Li_{1.05}Ni_{0.82}Co_{0.15}Al_{0.03}O_2$ | Rare earth compound (Sm) | Adhering to depressions at interfaces between primary particles (both of two adjacent primary particles at the depressions) | 79 |
| A5 | $Li_{1.05}Ni_{0.82}Co_{0.15}Al_{0.03}O_2$ | Rare earth compound (Nd) | Adhering to depressions at interfaces between primary particles (both of two adjacent primary particles at the depressions) | 79 |
| A6 | $Li_{1.05}Ni_{0.82}Co_{0.15}Al_{0.03}O_2$ | Zirconium compound | Adhering to depressions at interfaces between primary particles (both of two adjacent primary particles at the depressions) | 106 |
| B1 | $Li_{1.05}Ni_{0.35}Co_{0.35}Mn_{0.30}O_2$ | Rare earth compound (Er) | Adhering to projections on primary particles Adhering to depressions at interfaces between primary particles (one of two adjacent primary particles at the depressions) | 102 |
| B2 | $Li_{1.05}Ni_{0.35}Co_{0.35}Mn_{0.30}O_2$ | Rare earth compound (Er) | Adhering to but in uniform distribution throughout the surfaces of secondary particles | 100 |
| B3 | $Li_{1.05}Ni_{0.35}Co_{0.35}Mn_{0.30}O_2$ | None | — | 100 |

As is clear from the results in Table 1 above, when comparing batteries A1 to A5, in which a lithium transition metal oxide with a proportion of Ni of 82% was used, the DCR indices of batteries A1, A4, and A5 were low compared with those of batteries A2 and A3. In batteries A1, A4, and A5, secondary particles of the rare earth compound were adhering to depressions each created between two adjacent primary particles of the lithium transition metal oxide, and these secondary particles were adhering to both of the two adjacent primary particles at the depressions. In battery A2, particles of the rare earth compound were adhering to but in uniform distribution throughout the surfaces of secondary particles of the lithium transition metal oxide, and in battery A3, no rare earth compound particles were adhering to the surfaces of secondary particles of the lithium transition metal oxide.

When comparing batteries B1 to B3, in which a lithium transition metal oxide with a proportion of Ni of 35% was used, the DCR index of battery Bi was substantially comparable to those of batteries B2 and B3. In battery BI, secondary particles of the rare earth compound were adhering to projections on the surfaces of secondary particles of the lithium transition metal oxide or, even at depressions each created between two adjacent primary particles of the lithium transition metal oxide, to only one of the two adjacent primary particles at the depressions. In battery B2, particles of the rare earth compound were adhering to but in uniform distribution throughout the surfaces of secondary particles of the lithium transition metal oxide, and in battery B3, no rare earth compound particles were adhering to the surfaces of secondary particles of the lithium transition metal oxide. These results can be explained as follows.

In battery A3, no rare earth compound particles are adhering to the surfaces of secondary particles of the lithium transition metal oxide. In other words, there is no rare earth compound adhering in the form of secondary particles to depressions created between adjacent primary particles of the lithium transition metal oxide. After the aforementioned proton exchange, the interfaces between primary particles of the lithium transition metal oxide are further degraded during cycling and the surface condition of these interfaces between primary particles is altered. The consequent bad contacts between those primary particles of the lithium transition metal oxide that existed near the surfaces of secondary particles of the lithium transition metal oxide, and the accordingly increased resistance, presumably increased the direct current resistance (DCR).

Figure 4:
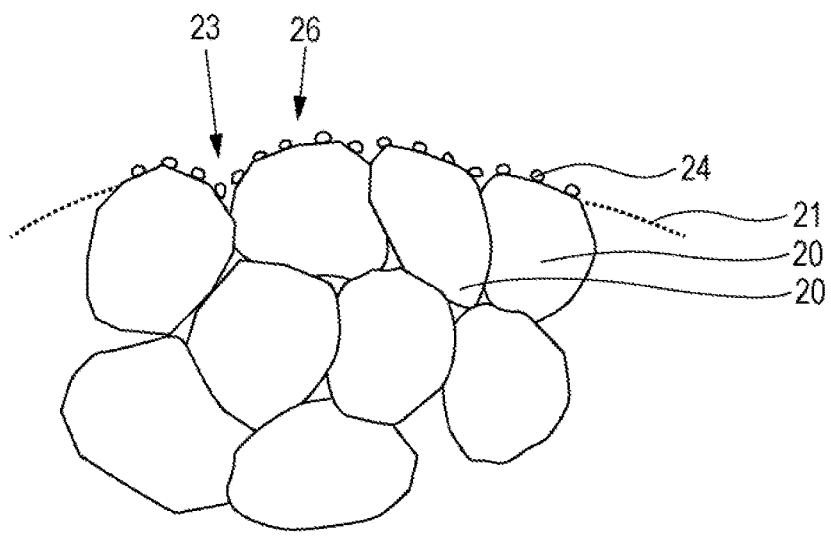
FIG. 4 is a schematic enlarged cross-section of part of a positive electrode active material according to Experimental Example 2 or Reference Example 2 of the present invention.

In battery A2, as illustrated in FIG. 4, primary particles 24 of the rare earth compound are adhering to but in uniform distribution throughout the surfaces of secondary particles 21 of the lithium transition metal oxide without forming secondary particles. In other words, in battery A2, primary particles 24 of the rare earth compound are adhering uniformly to the surfaces of secondary particles 21 of the lithium transition metal oxide, both to projections 26 and to depressions 23. Allowing particles of the rare earth compound to distribute uniformly over the surface of the active material as in battery A2 results in no rare earth compound adhering in the form of secondary particles to depressions created between primary particles of the lithium transition metal oxide. Presumably because of this, as was in the case of battery A3 above, the cracking of the active material due to surface alteration occurring at interfaces between the primary particles, i.e., a cause of increased DCR, was not prevented, and the DCR after cycling was increased.

In batteries A1, A4, and A5, as illustrated in FIG. 3, secondary particles 25 of the rare earth compound formed through the aggregation of primary particles 24 of the rare earth compound are adhering to depressions 23 created between primary particles of the lithium transition metal oxide, and these secondary particles are adhering to both of two adjacent primary particles 20 of the lithium transition metal oxide at the depressions 23. The presence of secondary particles of the rare earth compound not only reduces surface alteration that occurs on the surfaces of both of the two adjacent primary particles of the lithium transition metal oxide at the depressions, but also prevents bad contacts between the adjacent primary particles of the lithium transition metal oxide at the depressions by fixing (joining) them together. It is presumably because of this that increased DCR after cycling was controlled compared with those in batteries A2 and B2.

In batteries A1, A4, and A5, the high pH of the suspension (exceeding pH 10) allows the coating material to react quickly in the suspension and helps the rare earth compound readily segregate on the surface of the lithium transition metal oxide (helps form secondary particles of the rare earth compound). Furthermore, the use of a lithium transition metal oxide with a high Ni content (the proportion of Ni being not less than 80%) makes the aforementioned proton exchange likely to occur, allowing the alkali to continuously emerge from inside the lithium transition metal oxide and come up to the interfaces between its primary particles, thereby ensuring that a higher concentration of alkali in the spaces between primary particles of the lithium transition metal oxide than in the surroundings is maintained. Alkali-rich depressions were created between the primary particles, and primary particles of the rare earth compound presumably aggregated in such a manner as to be attracted to these depressions and separated out while forming secondary particles.

Figure 5:
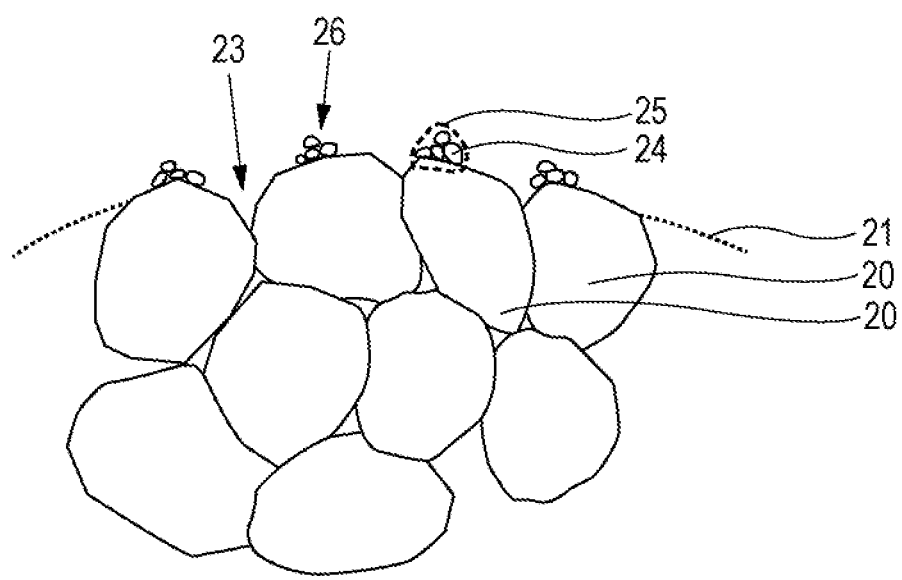
FIG. 5 is a schematic enlarged cross-section of part of a positive electrode active material according to Reference Example 1 of the present invention.

In battery Bi, as illustrated in FIG. 5, secondary particles 25 of the rare earth compound formed through the aggregation of primary particles 24 of the rare earth compound are adhering to projections 26 on the surfaces of secondary particles of the lithium transition metal oxide or, even at depressions 23 between primary particles of the lithium transition metal oxide, to only one of two adjacent primary particles 20 of the lithium transition metal oxide at the depressions 23. Thus in battery Bi, presumably, the rare earth compound was not as effective as in battery A1 above in the prevention of surface alteration occurring at interfaces between primary particles and the fixation (joining) of primary particles, and this is considered to be the cause of the failure to control increased DCR after cycling. In battery Bi, furthermore, the reaction through which alkali comes up to interfaces between primary particles is rare as in battery A1 because the proportion of Ni is less than 80%. Thus in this battery, it is rare that interfaces between primary particles of the lithium transition metal oxide are further degraded after proton exchange, and therefore the associated alteration of the surfaces of these primary particles is rare. It is presumably because of this that the DCR of battery Bi was similar to those of batteries 2 and B3, and this indicates that when the proportion of Ni is less than 80%, changing the state of adhesion of the rare earth compound such as whether it adheres or not and the points where to adhere has little influence on DCR.

In battery B3, similar to battery A3, no rare earth compound particles are adhering to the surfaces of secondary particles of the lithium transition metal oxide. In other words, there is no rare earth compound adhering in the form of secondary particles to depressions created at particle interfaces existing between primary particles of the lithium transition metal oxide on the surfaces of secondary particles of the lithium transition metal oxide.

In battery B2, similar to battery A2, primary particles 24 of the rare earth compound are adhering to but in uniform distribution throughout the surfaces of secondary particles 21 of the lithium transition metal oxide without forming secondary particles as illustrated in FIG. 4. In other words, in battery A2 and electron B2, primary particles 24 of the rare earth compound are adhering to both projections 26 and depressions 23 of the lithium transition metal oxide. As a result, battery B2, like battery A2, presumably has no such effect of preventing dissociation of primary particles due to surface alteration occurring at interfaces between the primary particles as demonstrated with batteries A1, A4, and A5, and this is considered to be the reason for the DCR similar to that in Experimental Example B3.

In battery A6, in which a zirconium compound was used instead of a rare earth compound, secondary particles of the zirconium compound were adhering to depressions each created between two adjacent primary particles of the lithium transition metal oxide, and these secondary particles were adhering to both of the two adjacent primary particles at the depressions. However, increased DCR after cycling was uncontrolled, and the DCR was higher than that of battery A3. Zirconium compounds, even when adhering to depressions each created between two adjacent primary particles of a lithium transition metal oxide and adhering to both of the two adjacent primary particles at the depressions, presumably have no such effect of preventing dissociation of primary particles due to surface alteration occurring at interfaces between the primary particles as rare earth compounds had, and this is considered to have caused the failure to control increased DCR after cycling.

Batteries A1, A4, and A5, in which the rare earth compounds used were erbium, samarium, and neodymium compounds, had comparable 100-cycle DCR indices. In light of this, any rare earth metal other than erbium, samarium, and neodymium is expected to be as highly effective in limiting DCR increases as these three when secondary particles of the rare earth compound are adhering to depressions each created between adjacent two primary particles of the lithium transition metal oxide and adhering to both of the two adjacent primary particles at the depressions.

Second Experiment

Experimental Example 4

A battery was produced in the same way as in Experimental Example 1 above. The thus produced battery is hereinafter referred to as battery C1. The DCR after 100 cycles was determined using battery C1 under the same charge and discharge conditions as with battery A1 above except that the charging voltage for 1 to 100 cycles during DCR measurement was changed from the battery voltage of 4.2 V (a positive electrode potential of 4.3 V with lithium as the reference) for Experimental Example 1 to a battery voltage of 4.4 V (a positive electrode potential of 4.5 V with lithium as the reference).

Experimental Example 5

A battery was produced in the same way as in Experimental Example 3 above. The thus produced battery is hereinafter referred to as battery C2. The DCR after 100 cycles was determined using battery C2 under the same charge and discharge conditions as with battery A3 above except that the charging voltage for 1 to 100 cycles during DCR measurement was changed from the battery voltage of 4.2 V (a positive electrode potential of 4.3 V with lithium as the reference) for Experimental Example 3 to a battery voltage of 4.4 V (a positive electrode potential of 4.5 V with lithium as the reference).

The DCR measurements of batteries C1 and C2 determined as above were used to calculate their 100-cycle DCR indices in the same way as the method described above for calculating the DCR index. For batteries C1 and C2, these calculations assumed that battery C2 (no rare earth compound adhering to the surfaces of secondary particles) had a 100-cycle DCR of 100 (reference). The results are summarized in Table 2 below, along with results from the batteries of Experimental Examples 1 and 3.

TABLE 2

| Battery | Lithium transition metal oxide | Adhering compound | State of adhesion | DCR index after 100 cycles |
|---|---|---|---|---|
| A1 | $Li_{1.05}Ni_{0.82}Co_{0.15}Al_{0.03}O_2$ | Rare earth compound (Er) | Adhering to depressions at interfaces between primary particles (both of two adjacent primary particles at the depressions) | 78 |
| A3 | $Li_{1.05}Ni_{0.82}Co_{0.15}Al_{0.03}O_2$ | None | — | 100 |
| C1 | $Li_{1.05}Ni_{0.82}Co_{0.15}Al_{0.03}O_2$ | Rare earth compound (Er) | Adhering to depressions at interfaces between primary particles (both of two adjacent primary particles at the depressions) | 49 |
| C2 | $Li_{1.05}Ni_{0.82}Co_{0.15}Al_{0.03}O_2$ | None | — | 100 |

As is clear from the results in Table 2 above, when comparing batteries C1 and C2, which were cycled with a battery voltage of 4.4 V, the DCR index of battery C1 was low compared with that of battery C2. In battery C1, secondary particles of the rare earth compound were adhering to depressions each created between two adjacent primary particles of the lithium transition metal oxide, and these secondary particles were adhering to both of the two adjacent primary particles at the depressions. In battery C2, no rare earth compound was adhering to the surfaces of secondary particles of the lithium transition metal oxide. This indicates that even when the battery voltage during cycling is 4.4 V, the effect obtained is similar to that with battery A1, which was cycled with a battery voltage of 4.2 V.

In the results in Table 2 above, furthermore, the difference in DCR index between batteries A1 and A3 is 22, whereas that between batteries C1 and C2 is as large as 51. From this, it can be understood that the stated effect of reducing DCR increases is more effective when the battery voltage is high.

When the battery is cycled with a high voltage, or when the potential of the positive electrode is high, surface alteration at interfaces between primary particles is more likely to occur. The resulting bad contacts between adjacent primary particles of the lithium transition metal oxide on the surfaces of secondary particles of the oxide greatly increase DCR. It is presumably because of this that the improvement in DCR index, which was made through the control of such surface alteration, was great.

Reference Experiment

Reference Experimental Example 1

A lithium-nickel-cobalt-aluminum composite oxide $Li_{1.05}Ni_{0.82}Co_{0.15}Al_{0.03}O_2$ was obtained with an average secondary particle diameter of approximately 15 μm in the same way as in Experimental Example 1, and this lithium-nickel-cobalt-aluminum composite oxide was used. Except for this, the same procedure was followed as in Experimental Example 1 above to produce battery X1.

Reference Experimental Example 2

With the use of the lithium-nickel-cobalt-aluminum composite oxide obtained in Reference Experimental Example 1, 1000 g of the lithium-nickel-cobalt-aluminum composite oxide was stirred in 1.5 L of purified water and then only stirred (water-washed) with no erbium sulfate aqueous solution added to the suspension, followed by drying in a vacuum. Except for this, the same procedure was followed as in Reference Experimental Example 1 above to obtain a lithium-nickel-cobalt-aluminum composite oxide. Battery X2 was produced in the same way as in Experimental Example 1 above except that this lithium-nickel-cobalt-aluminum composite oxide was used.

For each of batteries X1 and X2 above, the alkali content of the lithium-nickel-cobalt-aluminum composite oxide used therein was measured using Warder titration. Separately, batteries X1 and X2 above were subjected to a storage study under the conditions below to measure the swelling of each battery after storage. The results are summarized in Table 3.

<Conditions of Storage Study>
  Charging voltage: 4.2 V as battery voltage
  Temperature: 80° C.
  Duration: 2 days (48 hours)

TABLE 3

| Battery | Lithium transition metal oxide | Water-washed | Alkali content (% by mass) | Battery swelling after storage (mm) |
|---|---|---|---|---|
| X1 | $Li_{1.05}Ni_{0.82}Co_{0.15}Al_{0.03}O_2$ | No | 1.49 | 15.4 |
| X2 | $Li_{1.05}Ni_{0.82}Co_{0.15}Al_{0.03}O_2$ | Yes | 0.03 | 4.90 |

As is clear from the results in Table 3 above, the alkali content was small in battery X2 as compared with battery X1, and so was the battery swelling after storage. Battery X2 was produced with the obtained lithium-nickel-cobalt-aluminum composite oxide water-washed, whereas battery X1 was produced with the obtained lithium-nickel-cobalt-aluminum composite oxide not water-washed. This indicates that in order for superior high-temperature storage characteristics to be achieved, it is preferred to wash the obtained lithium transition metal oxide in some amount of water to remove the alkali component adhering to the surface of the lithium transition metal oxide.

REFERENCE SIGNS LIST

1 Positive electrode
2 Negative electrode
3 Separator
4 Positive electrode collector tab
5 Negative electrode collector tab
6 Laminated aluminum sheathing body
7 Heat-seal section 7
11 Nonaqueous electrolyte secondary battery
20 Primary particle of a lithium transition metal oxide
21 Secondary particle of a lithium transition metal oxide
23 Depression
24 Primary particle of a rare earth compound 25 Secondary particle of a rare earth compound
26 Projection

The invention claimed is:

1. A positive electrode active material for a nonaqueous electrolyte secondary battery, the positive electrode active material comprising lithium transition metal oxide secondary particles formed through aggregation of primary particles of the lithium transition metal oxide, the lithium transition metal oxide containing at least Ni, wherein
tertiary particles of at least one rare earth compound formed through aggregation of particles of the at least one rare earth compound being adhered to depressions, wherein each depression is created on surfaces of at least two adjacent primary particles, and the tertiary particles of the at least one rare earth compound being adhered to both of the two adjacent primary particles at the depressions,
wherein the at least one rare earth compound is selected from hydroxides and oxyhydroxides,
wherein a pH of a solution dispersing the lithium transition metal oxide is 11.5 or more.

2. The positive electrode active material according to claim 1 for a nonaqueous electrolyte secondary battery, wherein the at least one rare earth compound contains at least one rare earth metal, and the at least one rare earth metal is selected from neodymium, samarium, and erbium.

3. The positive electrode active material according to claim 1 for a nonaqueous electrolyte secondary battery, wherein an average particle diameter of the tertiary particles of the at least one rare earth compound is 100 nm or more and 400 nm or less.

4. The positive electrode active material according to claim 1 for a nonaqueous electrolyte secondary battery, wherein an average particle diameter of the primary particles of the lithium transition metal oxide is 100 nm or more and 5 μm or less.

5. The positive electrode active material according to claim 1 for a nonaqueous electrolyte secondary battery, wherein a proportion of Ni in the lithium transition metal oxide is 80% or more with respect to a total amount by mole of metals excluding lithium.

6. The positive electrode active material according to claim 1 for a nonaqueous electrolyte secondary battery, wherein an average particle diameter of the tertiary particles of the at least one rare earth compound is 150 mm or more and 400 mm or less.

7. A positive electrode active material for a nonaqueous electrolyte secondary battery, the positive electrode active material comprising lithium transition metal oxide secondary particles formed through aggregation of primary particles of the lithium transition metal oxide, the lithium transition metal oxide containing at least Ni, wherein
tertiary particles of at least one rare earth compound formed through aggregation of particles of the at least one rare earth compound being adhered to depressions, wherein each depression is created on surfaces of at least two adjacent primary, and the tertiary particles of the at least one rare earth compound being adhered to both of the two adjacent primary particles at the depressions,
wherein the positive electrode active material is prepared by adding a solution of rare earth salt to a solution dispersing the lithium transition metal oxide containing at least Ni and
depositing rare earth hydroxides to the depressions;
heat-treating the lithium transition metal oxide depositing the rare earth hydroxide,
wherein a pH of a solution dispersing the lithium transition metal oxide is 11.5 or more.

8. The positive electrode active material according to claim 7 for a nonaqueous electrolyte secondary battery, wherein the at least one rare earth compound contains at least one rare earth metal, and the at least one rare earth metal is selected from neodymium, samarium, and erbium.

9. The positive electrode active material according to claim 7 for a nonaqueous electrolyte secondary battery, wherein the at least one rare earth compound is selected from hydroxides and oxyhydroxides.

10. The positive electrode active material according to claim 7 for a nonaqueous electrolyte secondary battery, wherein an average particle diameter of the tertiary particles of the at least one rare earth compound is 100 nm or more and 400 nm or less.

11. The positive electrode active material according to claim 7 for a nonaqueous electrolyte secondary battery, wherein an average particle diameter of the primary particles of the lithium transition metal oxide is 100 nm or more and 5 μm or less.

12. The positive electrode active material according to claim 7 for a nonaqueous electrolyte secondary battery, wherein a proportion of Ni in the lithium transition metal oxide is 80% or more with respect to a total amount by mole of metals excluding lithium.

13. The positive electrode active material according to claim 7 for a nonaqueous electrolyte secondary battery, wherein an average particle diameter of the tertiary particles of the at least one rare earth compound is 150 mm or more and 400 mm or less.

* * * * *